US010288190B2

(12) United States Patent
Becker

(10) Patent No.: US 10,288,190 B2
(45) Date of Patent: May 14, 2019

(54) INTERLOCKING SOLENOID VALVE ASSEMBLY AND METHOD

(71) Applicant: Schaeffler Technologies AG & Co. KG, Herzogenaurach (DE)

(72) Inventor: David Becker, White Lake, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 144 days.

(21) Appl. No.: 15/633,067

(22) Filed: Jun. 26, 2017

(65) Prior Publication Data

US 2018/0372239 A1 Dec. 27, 2018

(51) Int. Cl.
| | |
|---|---|
| *F16K 31/06* | (2006.01) |
| *F16K 31/42* | (2006.01) |
| *F15B 13/02* | (2006.01) |
| *F16K 27/04* | (2006.01) |
| *F15B 15/28* | (2006.01) |
| *H01F 7/16* | (2006.01) |

(52) U.S. Cl.
CPC .......... *F16K 31/426* (2013.01); *F15B 13/021* (2013.01); *F15B 15/2884* (2013.01); *F16K 27/041* (2013.01); *F15B 2211/3122* (2013.01); *H01F 7/1638* (2013.01)

(58) Field of Classification Search
CPC .... F16K 27/029; F16K 27/041; F16K 27/048; F16K 31/426
USPC ................................... 137/315.03
See application file for complete search history.

(56) References Cited

U.S. PATENT DOCUMENTS

| | | | |
|---|---|---|---|
| 4,815,190 A | 3/1989 | Haba, Jr. et al. | |
| 4,842,010 A | 6/1989 | Edgecomb et al. | |
| 5,853,028 A | 12/1998 | Ness et al. | |
| 6,386,220 B1* | 5/2002 | Koenings | F16K 31/0613 137/15.21 |
| 6,684,901 B1* | 2/2004 | Cahill | F16K 31/0655 137/15.18 |
| 7,886,760 B2* | 2/2011 | Groschel | F16K 31/06 137/315.03 |
| 9,964,220 B1* | 5/2018 | Ro | F16K 31/0672 |
| 10,139,006 B2* | 11/2018 | Muraoka | H01F 7/126 |
| 2001/0023931 A1* | 9/2001 | Fukano | F16K 31/0627 251/129.15 |
| 2008/0203340 A1* | 8/2008 | Moreno | F16K 31/0637 251/129.01 |
| 2009/0038690 A1* | 2/2009 | Zur | H01F 7/126 137/315.03 |

* cited by examiner

*Primary Examiner* — Reinaldo Sanchez-Medina
(74) *Attorney, Agent, or Firm* — Volpe and Koenig, P.C.

(57) ABSTRACT

A method of assembling a solenoid valve assembly is disclosed. The method includes inserting an axial end of a valve housing partially through an aperture of a tab. The axial end of the valve housing extends partially through an opening of a solenoid housing. An interlocking element is positioned in a first axial end of the solenoid housing. The method includes inserting a petal of the valve housing into a pocket of the interlocking element. The method includes engaging the interlocking element with an installation tool and rotating the installation tool to rotate the interlocking element and the valve housing until a lip of the solenoid housing is axially positioned between (1) the petal of the valve housing and (2) a protrusion of the tab, such that the valve housing, the tab, and the solenoid housing are fixed to each other.

19 Claims, 11 Drawing Sheets

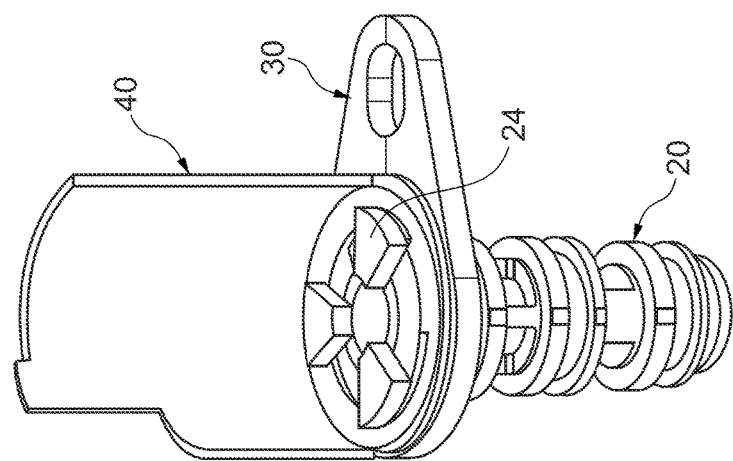
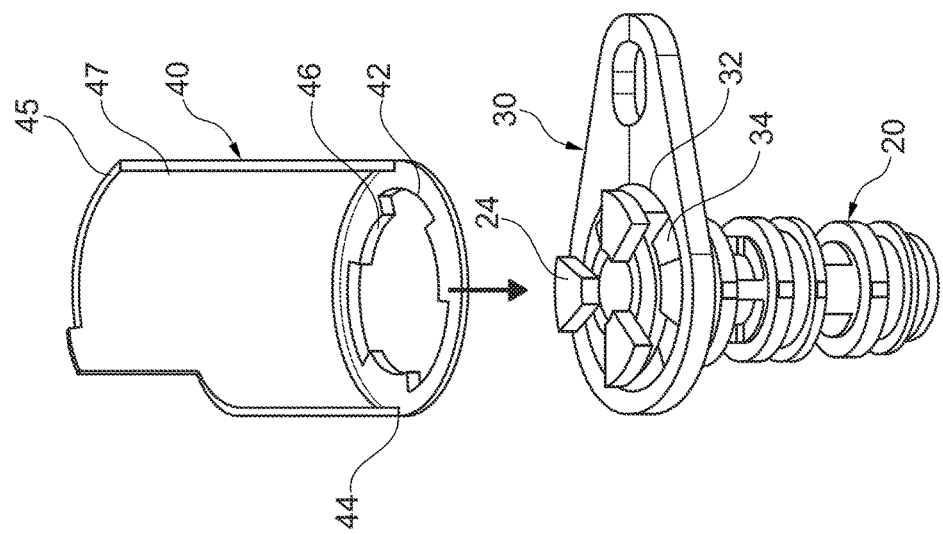

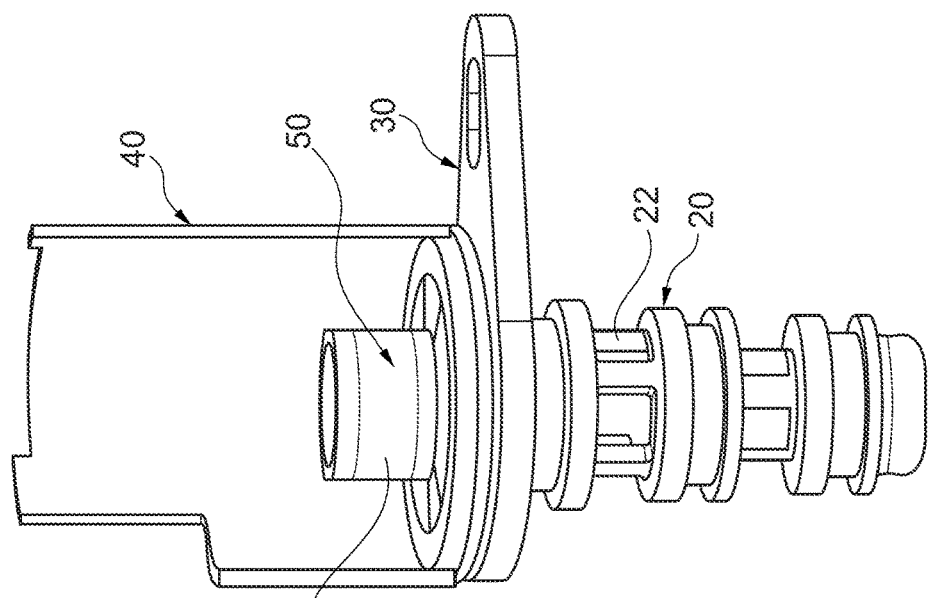
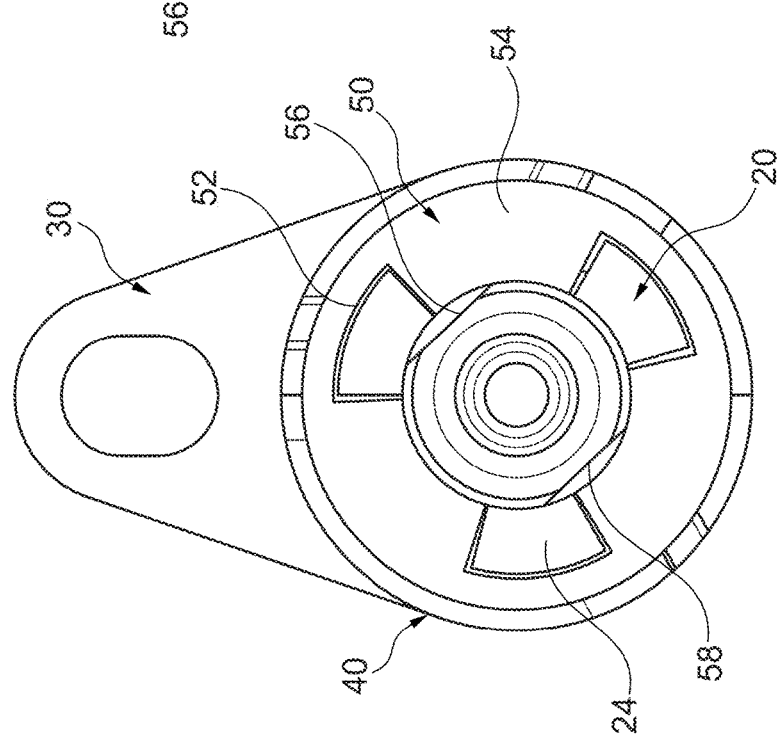

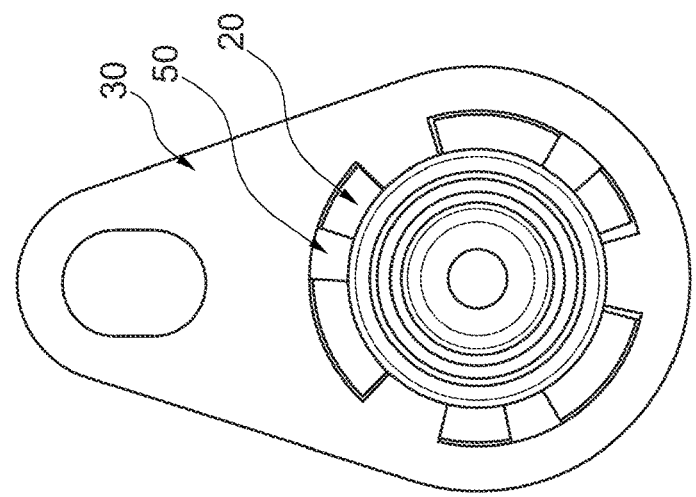
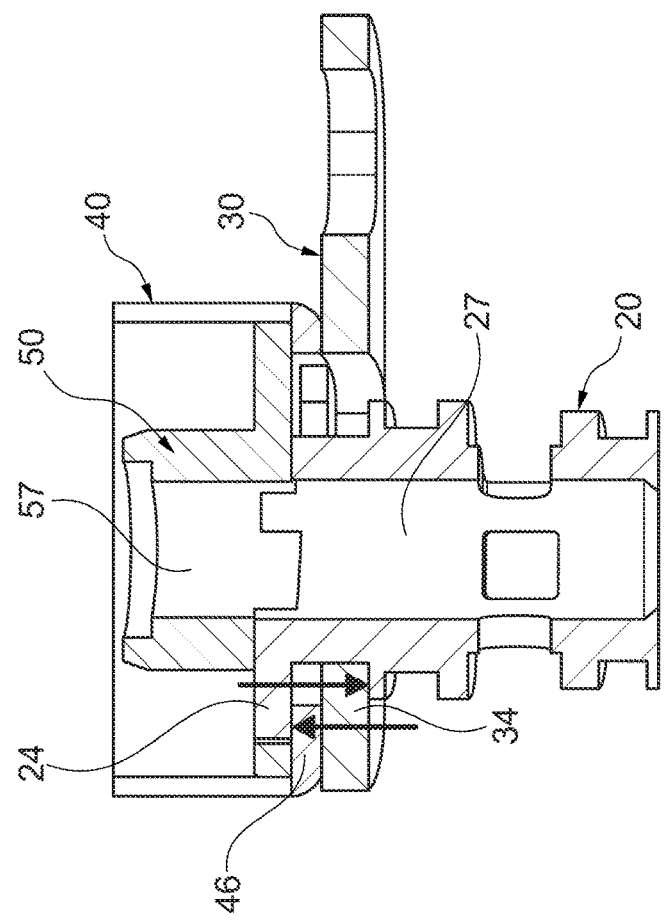

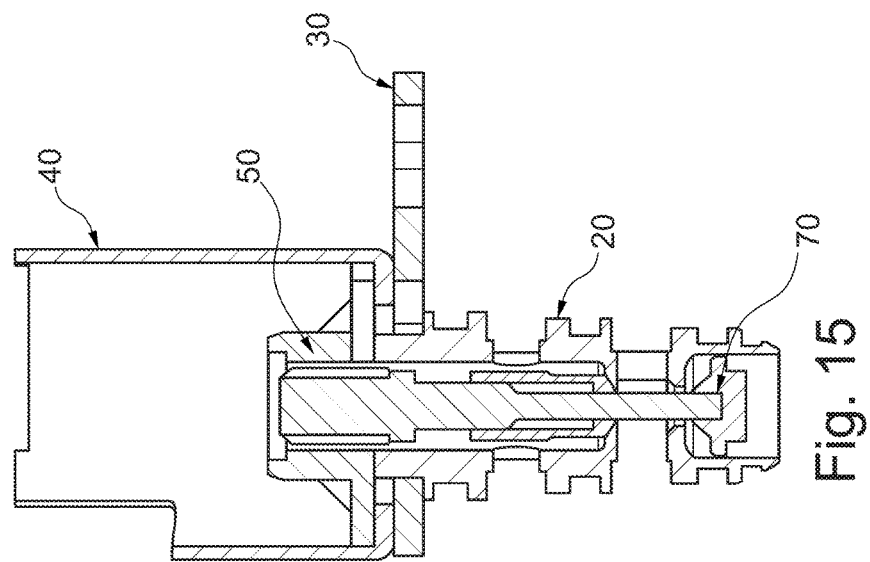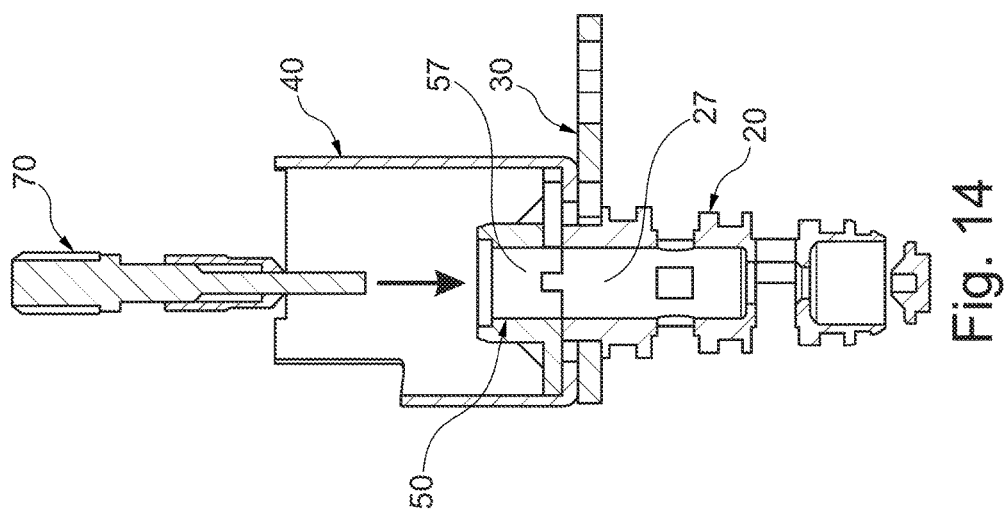

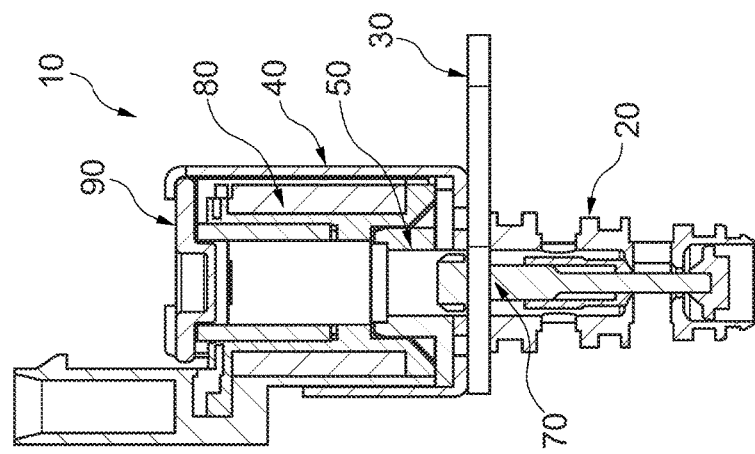
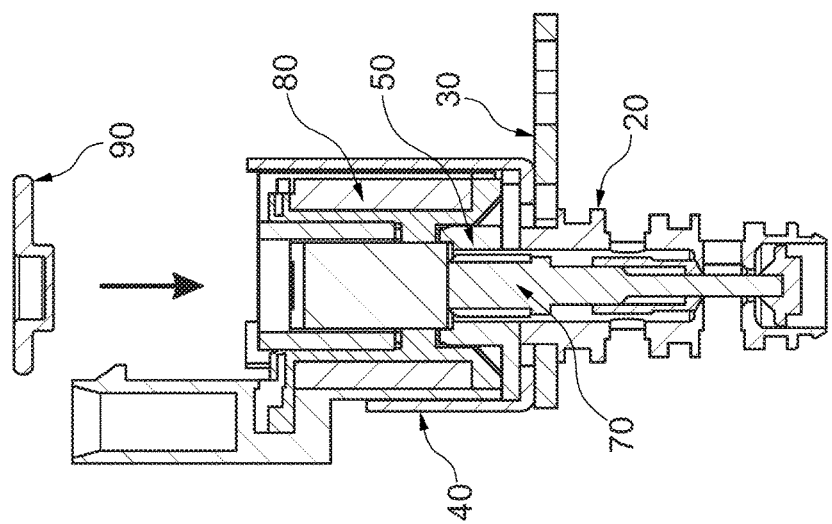

INTERLOCKING SOLENOID VALVE ASSEMBLY AND METHOD

FIELD OF INVENTION

This application is generally related to a solenoid valve assembly, and is more particularly related to fixing a solenoid housing to a valve housing for a solenoid valve assembly.

BACKGROUND

Control valves are known that use a solenoid actuator to switch open or closed the interface between a spool valve and a valve body. Fixing a solenoid housing to a valve housing of a solenoid valve assembly typically requires a staking operation, such as heat staking and/or ultrasonic staking. These staking processes require relatively complex and expensive machines, and are time consuming. Furthermore, these staking processes require significant knowledge about the components involved in these processes, and require a high level of attentiveness during assembly to provide a reliable connection between the solenoid housing and the valve housing. Other known solenoid assemblies and methods of fixing sub-components of a solenoid assembly to each other are disclosed in U.S. Pat. No. 4,815,190; U.S. Pat. No. 4,842,010; and U.S. Pat. No. 5,853,028.

It would be desirable to provide a process for fixing a solenoid housing to a valve housing that eliminates staking or swaging, and that is relatively straightforward, quick, and reliable.

SUMMARY

Briefly stated, a quick, reliable, and simple method for assembling a solenoid valve assembly is disclosed. The method includes providing: a valve housing including a hydraulic fluid pathway and at least one petal extending radially from an axial end of the valve housing; a tab including an aperture and at least one protrusion extending radially into the aperture; a solenoid housing including an opening defined at a first axial end of the solenoid housing, the opening defining at least one lip; an interlocking element including at least one pocket defined on a radially extending flange; and an installation tool.

The method includes inserting the axial end of the valve housing partially through the aperture of the tab, and then inserting the axial end of the valve housing partially through the opening of the solenoid housing. The method includes positioning the interlocking element in the first axial end of the solenoid housing, and then inserting the at least one petal of the valve housing into the at least one pocket of the interlocking element. The method includes engaging the interlocking element with the installation tool and rotating the installation tool to rotate the interlocking element and the valve housing until the at least one lip of the solenoid housing is axially positioned between (1) the at least one petal of the valve housing and (2) the at least one protrusion of the tab, such that the valve housing, the tab, and the solenoid housing are fixed to each other.

Additional assembly steps can be carried out after the solenoid housing, the tab, and the valve housing are fixed to each other, such as inserting a valve body into the valve housing, inserting a solenoid assembly into the solenoid housing, and closing the solenoid housing.

The features noted above and in the description below can be used separately or in combination in connection with various different types of solenoid assemblies.

BRIEF DESCRIPTION OF THE DRAWINGS

The foregoing Summary as well as the following Detailed Description will be best understood when read in conjunction with the appended drawings. In the drawings:

FIG. 5 illustrates a perspective view of the assembly with a solenoid housing prior to assembly with the tab and the valve housing.

FIG. 6 illustrates a perspective view of the assembly after inserting an axial end of the valve housing through an opening of the solenoid housing.

FIG. 8 illustrates a top view of the assembly after inserting a petal of the valve housing into a pocket of the interlocking element.

FIG. 9 illustrates a perspective view of the assembly according to FIG. 8.

FIG. 12 illustrates a side cross-sectional view of a portion of the assembly illustrating an axial overlap between the valve housing, the tab, and the solenoid housing.

FIG. 13 illustrates a top view of the assembly after the interlocking element is rotated.

FIG. 14 illustrates a side cross-sectional view of the assembly prior to insertion of a valve body.

FIG. 15 illustrates a side cross-sectional view of the assembly after insertion of the valve body into the valve housing.

FIG. 18 illustrates a side cross-sectional view of the assembly prior to insertion of an end cap.

FIG. 19 illustrates a side cross-sectional view of the assembly in an assembled state.

DETAILED DESCRIPTION OF THE PREFERRED EMBODIMENTS

Figure 1:
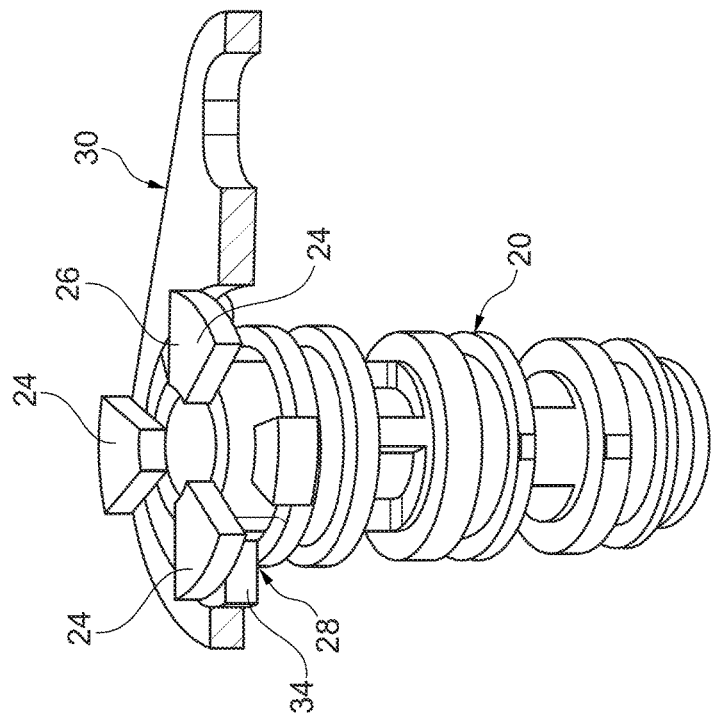
FIG. 1 illustrates a perspective view of a valve housing and a tab prior to inserting the valve housing into the tab.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

As shown in the various steps illustrated throughout FIGS. 1-19, a method of assembling a solenoid valve assembly 10 is disclosed. The fully assembled solenoid valve assembly 10 is shown in FIG. 19. The method includes providing a valve housing 20 including a hydraulic fluid pathway 22 and at least one petal 24 extending radially from an axial end 26 of the valve housing 20. A tab 30 includes an aperture 32 and at least one protrusion 34 extending radially into the aperture 32. A solenoid housing 40 includes an opening 42 defined at a first axial end 44 of the solenoid housing 40, and the opening 42 defines at least one lip 46. An interlocking element 50 includes at least one pocket 52 defined on a radially extending flange 54.

Figure 2:
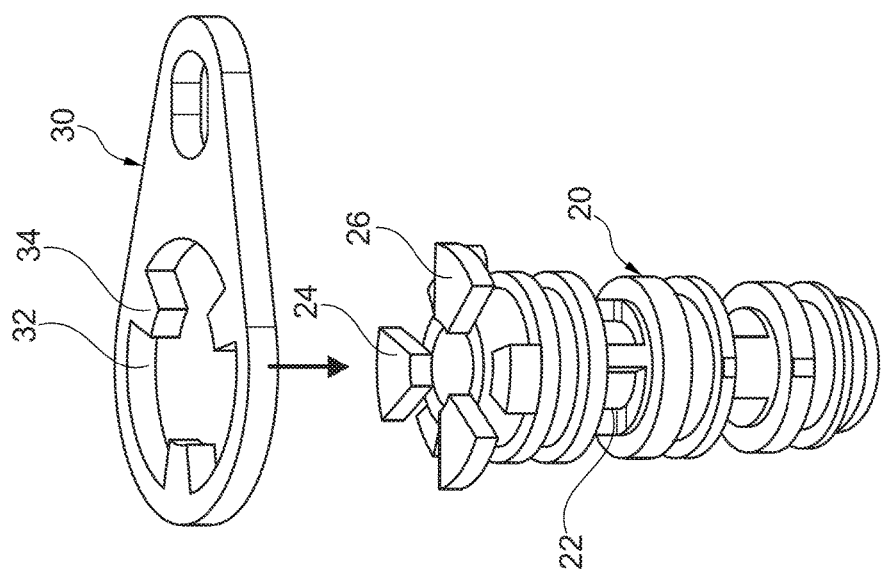
FIG. 2 illustrates a perspective view of the valve housing and the tab after insertion of the valve housing into the tab.
Figure 4:
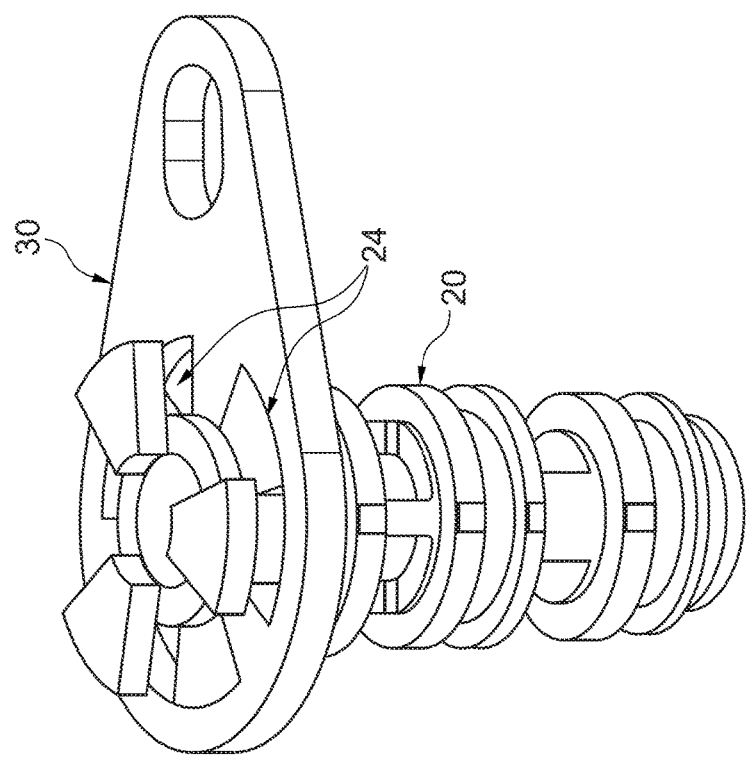
FIG. 4 illustrates a perspective view of the valve housing extending through an aperture of the tab.
Figure 3:
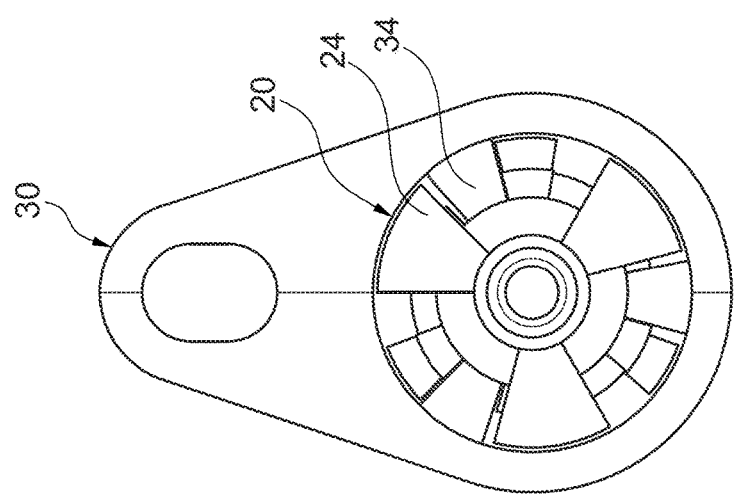
FIG. 3 illustrates a top view of the valve housing and the tab after insertion of the valve housing into the tab.

The method includes inserting the axial end 26 of the valve housing 20 partially through the aperture 32 of the tab 30, as shown in FIGS. 1-4. The axial end 26 of the valve housing 20 preferably includes a ledge 28 defined axially below the at least one petal 24. As shown in FIG. 2, the tab 30 rests on the ledge 28 after the valve housing 20 is inserted through the aperture 32 of the tab 30.

Figure 7:
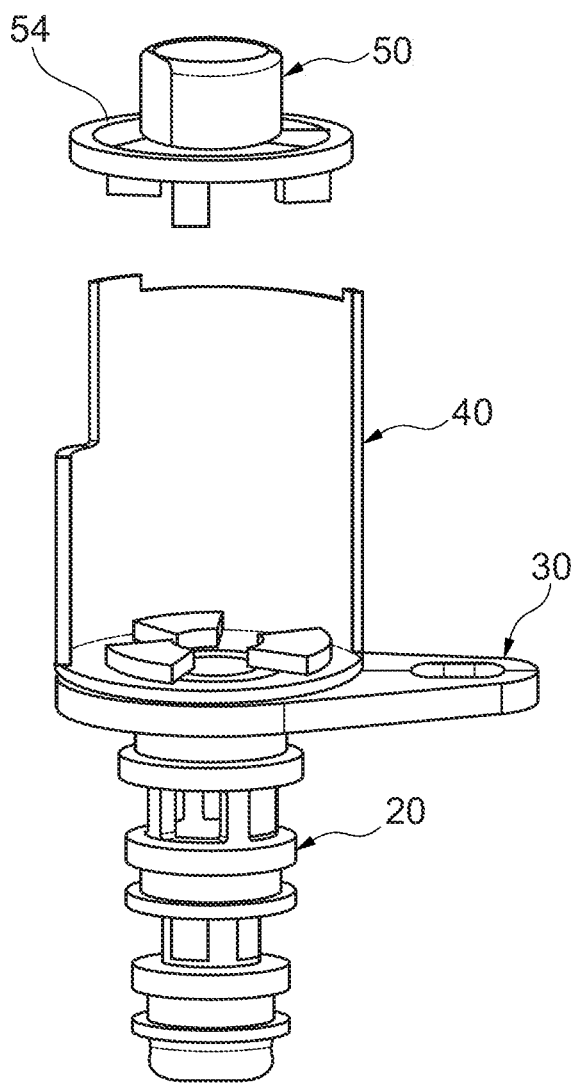
FIG. 7 illustrates a perspective view of the assembly prior to positioning an interlocking element within the solenoid housing.

The axial end 26 of the valve housing 20 is also inserted partially through the opening 42 of the solenoid housing 40, as shown in FIGS. 5 and 6. The method includes positioning the interlocking element 50 in the first axial end 44 of the solenoid housing 40, as shown in FIGS. 7-9. The method includes inserting the at least one petal 24 of the valve housing 20 into the at least one pocket 52 of the interlocking element 50, which is shown most clearly in FIG. 8. Next, the method includes engaging the interlocking element 50 with an installation tool 60 (shown most clearly in FIG. 10), and rotating the installation tool 60 to rotate the interlocking element 50 and the valve housing 20 until the at least one lip 46 of the solenoid housing 40 is axially positioned between (1) the at least one petal 24 of the valve housing 20 and (2) the at least one protrusion 34 of the tab 30 (shown in FIGS. 11-13), such that the valve housing 20, the tab 30, and the solenoid housing 40 are fixed to each other. The semi-assembled solenoid valve assembly 10, with annotations showing an axial overlap between the petal 24, protrusion 34, and lip 46, is clearly illustrated in FIG. 12. Accordingly, the semi-assembled solenoid valve assembly 10 does not require a staking operating to assemble the valve housing 20 to the solenoid housing 40.

Additional assembly steps are described below and illustrated in FIGS. 14-18, and the fully assembled solenoid valve assembly 10 is shown in FIG. 19.

In one embodiment, the interlocking element 50 includes a non-round pole 56 extending from the radially extending flange 54, and the non-round pole 56 is engaged by the installation tool 60 to rotate the interlocking element 50. In one embodiment, the non-round pole 56 of the interlocking element 50 includes at least one flat 58. The at least one flat 58 can include two diametrically opposed flats 58. One of ordinary skill in the art would recognize from the present disclosure that alternative non-round profiles or interfaces can be used on the interlocking element 50 as long as the interlocking element 50 can be engaged and rotated by the installation tool 60.

In one embodiment, the interlocking element 50 defines a first chamber 57 and the valve housing 20 defines a second chamber 27. The first chamber 57 and the second chamber 27 are configured to define a passage for a valve body 70, shown most clearly in FIGS. 14 and 15.

One of ordinary skill in the art would recognize from the present disclosure that the configuration, shape, dimensions, and/or quantity of the petals 24, the protrusions 34, the lips 46, and the pockets 52 can be varied, while still providing axial interference between the valve housing 20, the tab 30, and the solenoid housing 40. For example, in one embodiment the at least one petal 24 of the valve housing 20 includes three petals 24. In one embodiment, the three petals 24 are angularly spaced apart from each other by 120°. In one embodiment, the at least one protrusion 34 of the tab 30 includes three protrusions 34. In one embodiment, three protrusions 34 are angularly spaced apart from each other by 120°. In one embodiment, the at least one pocket 52 of the interlocking element 50 includes three pockets 52. In one embodiment, the three pockets 52 are angularly spaced apart from each other by 120°.

In one embodiment, the installation tool 60 is rotated at least 25° to provide axial interference of the lip 46 between the petal 24 and the protrusion 34. In another embodiment, the installation tool 60 is rotated by 45° to provide axial interference of the lip 46 between the petal 24 and the protrusion 34. Visual indicators or other indicia can be provided to provide an indication to an operator or user regarding how far the installation tool 60 must be rotated to ensure a reliable axial interference between the lip 46, the petal 24, and the protrusion 34.

The installation tool 60 can include a tubular body 62 defining an inner channel 64. The inner channel 64 of the installation tool 60 and the non-round pole 56 of the interlocking element 50 have mating profiles. Alternative configurations, shapes, dimensions, and features of the installation tool 60 can be provided as long as the installation tool 60 provides a mating interface with the interlocking element 50. One of ordinary skill in the art would recognize from the present disclosure that the installation tool 60 can either be manually engaged by an operator or engaged by a robotic assembly arm.

Figure 10:
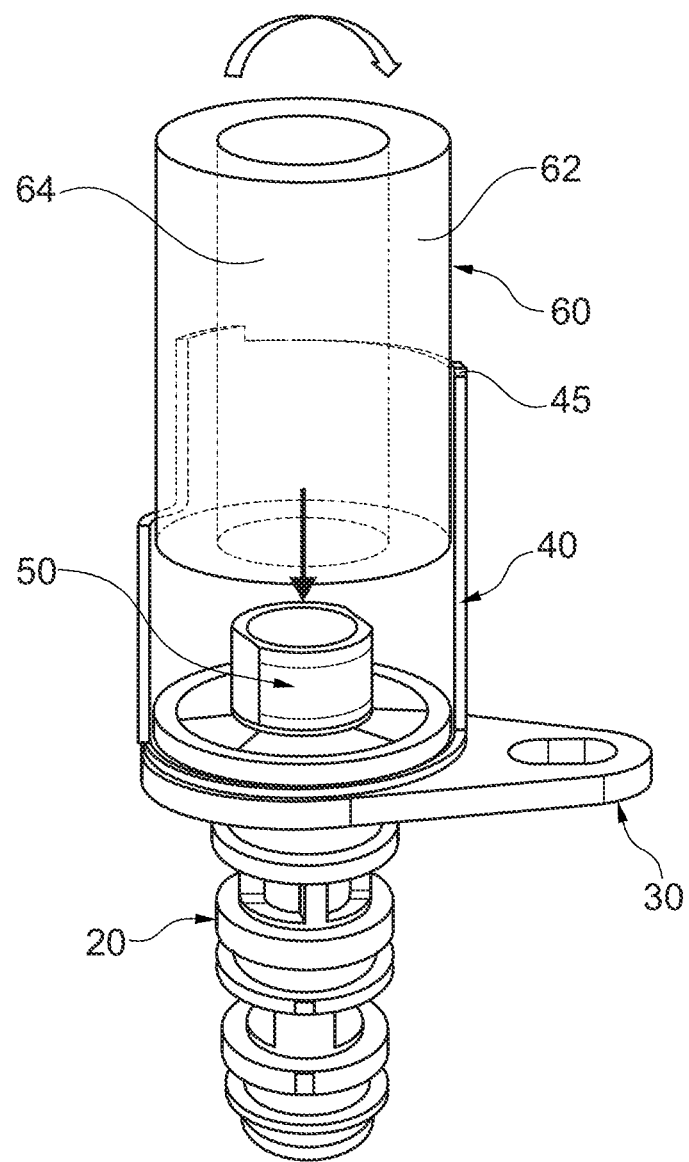
FIG. 10 illustrates a perspective view of the assembly including an installation tool for engaging the interlocking element.
Figure 11:
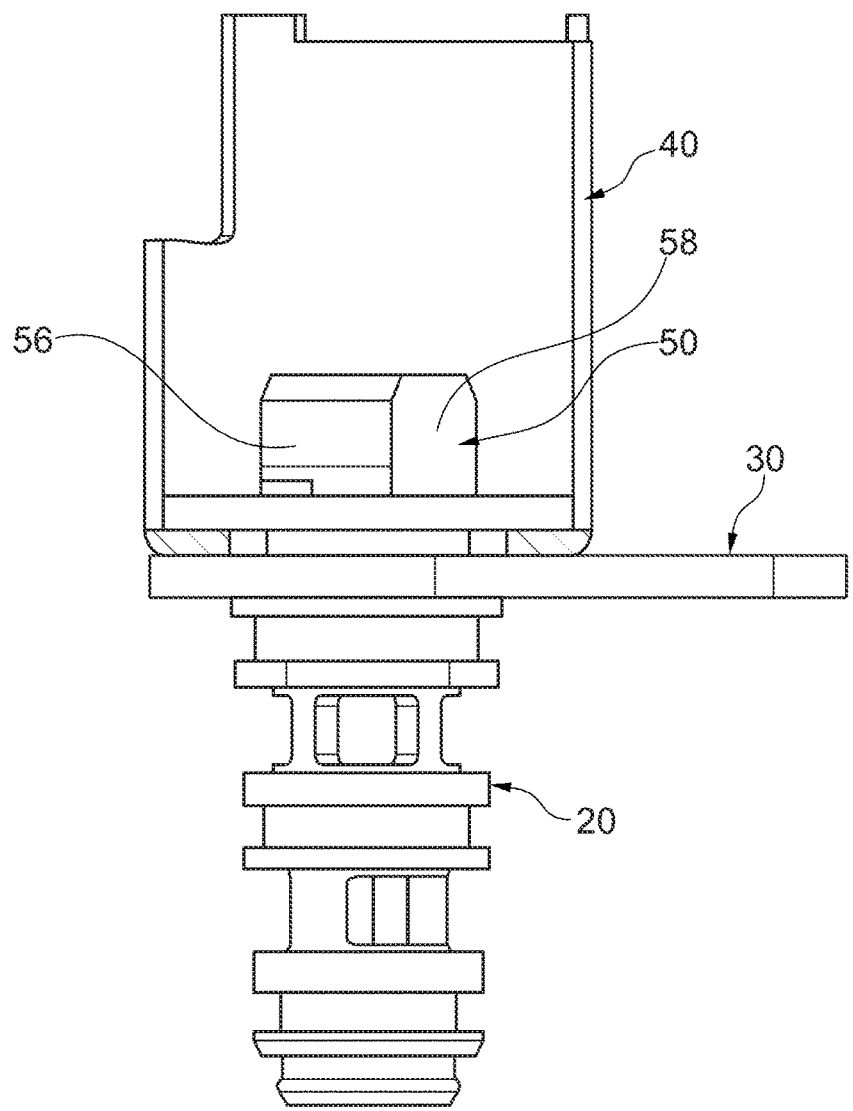
FIG. 11 illustrates a perspective view of the assembly after the interlocking element is rotated.

In one embodiment, the solenoid housing 40 defines a second axial end 45 opposite from the first axial end 44. The second axial end 45 is defined by an outer cylindrical wall 47 of the solenoid housing 40. As shown in FIG. 10, the installation tool 60 is inserted through the second axial end 45 of the solenoid housing 40 prior to rotation of the interlocking element 50.

The method includes additional assembly steps to fully assemble the solenoid valve assembly 10 after the valve housing 20, the tab 30, and the solenoid housing 40 are fixed to each other, as shown in FIGS. 14-19. The method includes inserting the valve body 70 within the valve housing 20, shown most clearly in FIGS. 14 and 15. As shown in FIGS. 14 and 15, the valve body 70 is inserted through the solenoid housing 40 and into the valve housing 20. An end of the valve body 70 is staked to retain the valve body 70 within the valve housing 20. The valve body 70 includes known vale body components with respect to a solenoid valve assembly, such as a spring, sealing body, sealing element, filter, seat, etc.

Figure 17:
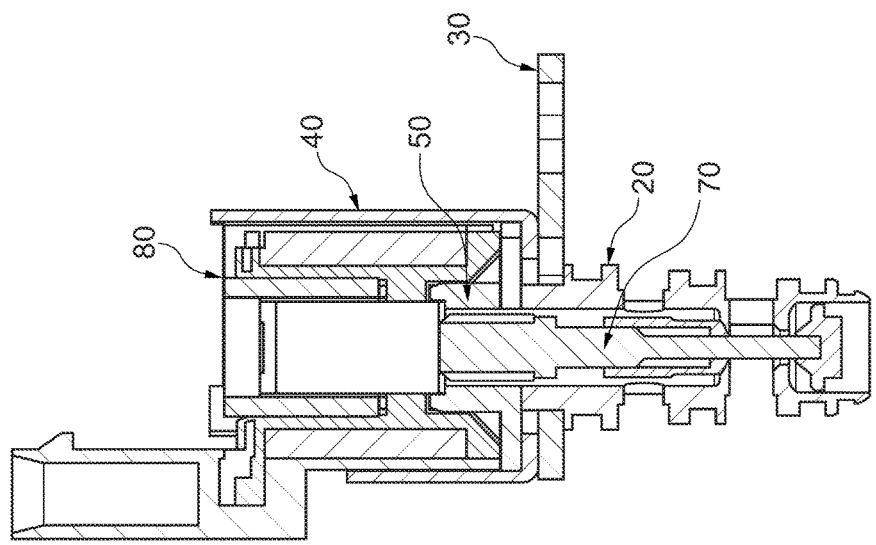
FIG. 17 illustrates a side cross-sectional view of the assembly after insertion of the solenoid assembly.
Figure 16:
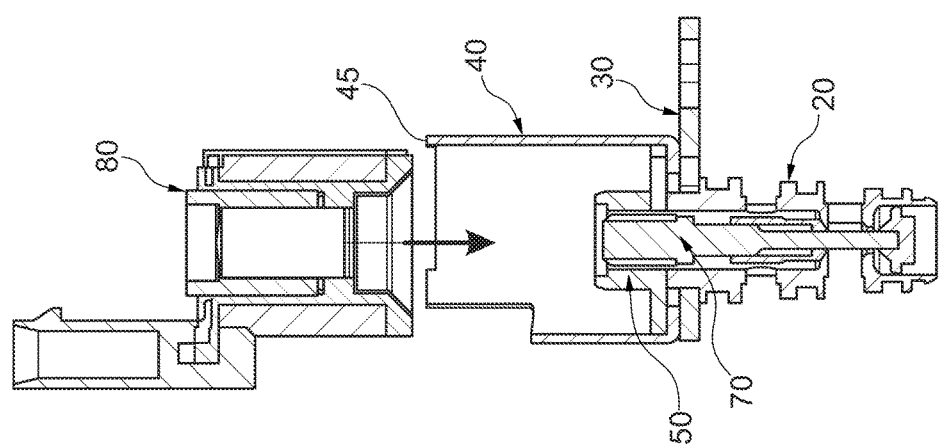
FIG. 16 illustrates a side cross-sectional view of the assembly prior to insertion of a solenoid assembly.

As shown in FIGS. 16 and 17, the method includes inserting a solenoid assembly 80 into the solenoid housing 40. The solenoid assembly 80 is preferably inserted through the second axial end 45 of the solenoid housing 40. The solenoid assembly 80 includes known solenoid assembly sub-components, such as an overmold, terminal yoke, pole, armature, bobbin, coil, O-ring, etc. As shown in FIGS. 18 and 19, an end cap 90 is inserted into the second axial end 45 of the solenoid housing 40. After the cap 90 is inserted into the solenoid housing 40, the second axial end 45 of the solenoid housing 40 is sealed to retain the solenoid assembly 80 within the solenoid housing 40. The second axial end 45 of the solenoid housing 40 can be crimped or otherwise bent to retain the cap 90 within the solenoid housing 40. The fully assembled solenoid valve assembly 10 is shown in FIG. 19.

One of ordinary skill in the art would recognize from the present disclosure that alternative assembly steps can be used, or the order of the assembly steps can be varied, while still maintaining the axial interlocking features between the valve housing 20, the tab 30, and the solenoid housing 40.

Having thus described various embodiments of the present method for assembling a solenoid valve assembly and structure of a solenoid valve assembly in detail, it will be appreciated and apparent to those skilled in the art that many changes, only a few of which are exemplified in the detailed description above, could be made in the embodiments according to the invention without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG OF REFERENCE NUMERALS solenoid valve assembly 10
valve housing 20
hydraulic fluid pathway 22
petal 24
axial end 26
second chamber 27
ledge 28
tab 30
aperture 32
protrusion 34
solenoid housing 40
opening 42
first axial end 44
second axial end 45
lip 46
wall 47
interlocking element 50
pocket 52
radially extending flange 54
pole 56
first chamber 57
flat 58
installation tool 60
tubular body 62
inner channel 64
valve body 70
solenoid assembly 80
cap 90

What is claimed is:

1. A method of assembling a solenoid valve assembly, the method comprising:
    (a) providing:
        a valve housing including a hydraulic fluid pathway and at least one petal extending radially from an axial end of the valve housing;
        a tab including an aperture and at least one protrusion extending radially into the aperture;
        a solenoid housing including an opening defined at a first axial end of the solenoid housing, the opening defining at least one lip;
        an interlocking element including at least one pocket defined on a radially extending flange; and
        an installation tool;
    (b) inserting the axial end of the valve housing partially through the aperture of the tab;
    (c) inserting the axial end of the valve housing partially through the opening of the solenoid housing;
    (d) positioning the interlocking element in the first axial end of the solenoid housing;
    (e) inserting the at least one petal of the valve housing into the at least one pocket of the interlocking element; and
    (f) engaging the interlocking element with the installation tool and rotating the installation tool to rotate the interlocking element and the valve housing until the at least one lip of the solenoid housing is axially positioned between (1) the at least one petal of the valve housing and (2) the at least one protrusion of the tab, such that the valve housing, the tab, and the solenoid housing are fixed to each other.

2. The method of claim 1, wherein the interlocking element includes a non-round pole extending from the radially extending flange, and the non-round pole is engaged by the installation tool to rotate the interlocking element.

3. The method of claim 2, wherein the non-round pole includes at least one flat.

4. The method of claim 3, wherein the at least one flat includes two diametrically opposed flats.

5. The method of claim 1, wherein the interlocking element defines a first chamber and the valve housing defines a second chamber, and the first chamber and the second chamber are configured to define a passage for a valve body.

6. The method of claim 1, wherein the at least one petal of the valve housing includes three petals.

7. The method of claim 6, wherein the three petals are angularly spaced apart from each other by 120°.

8. The method of claim 1, wherein the at least one protrusion of the tab includes three protrusions.

9. The method of claim 8, wherein the three protrusions are angularly spaced apart from each other by 120°.

10. The method of claim 1, wherein the at least one pocket of the interlocking element includes three pockets.

11. The method of claim 10, wherein the three pockets are angularly spaced apart from each other by 120°.

12. The method of claim 1, wherein the installation tool is rotated at least 25° during step (f).

13. The method of claim 1, wherein the installation tool is rotated by 45° during step (f).

14. The method of claim 1, wherein the installation tool includes a tubular body defining an inner channel.

15. The method of claim 14, wherein the inner channel of the installation tool and a non-round pole of the interlocking element have mating profiles.

16. The method of claim 1, wherein the axial end of the valve housing includes a ledge defined axially below the at least one petal, and the tab rests on the ledge after step (b).

17. The method of claim 1, wherein the solenoid housing defines a second axial end opposite from the first axial end, the second axial end is defined by an outer cylindrical wall of the solenoid housing, and the installation tool is inserted through the second axial end during step (f).

18. The method of claim 1, the method further comprising inserting a valve body within the valve housing, inserting a solenoid assembly within the solenoid housing, and sealing a second axial end of the solenoid housing with an end cap to retain the solenoid assembly within the solenoid housing.

19. A solenoid valve assembly comprising:
a valve housing including a hydraulic fluid pathway and at least one petal extending radially from an axial end of the valve housing;
a tab including an aperture and at least one protrusion extending radially into the aperture;
a solenoid housing including an opening defined at a first axial end of the solenoid housing, the opening defining at least one lip; and
an interlocking element including at least one pocket defined on a radially extending flange;
wherein the at least one pocket of the interlocking element and the at least one petal of the valve housing engage with each other, and rotation of the interlocking element and the valve housing axially positions the least one lip of the solenoid housing between (1) the at least one petal of the valve housing and (2) the at least one protrusion of the tab.

* * * * *